United States Patent [19]

Wengrovius

[11] Patent Number: 4,554,338

[45] Date of Patent: Nov. 19, 1985

[54] ROOM TEMPERATURE VULCANIZABLE ORGANOPOLYSILOXANE COMPOSITIONS AND METHOD FOR MAKING

[75] Inventor: Jeffrey H. Wengrovius, Scotia, N.Y.

[73] Assignee: General Electric Company, Schenectady, N.Y.

[21] Appl. No.: 644,893

[22] Filed: Aug. 27, 1984

[51] Int. Cl.$^4$ .............................................. C08G 77/06
[52] U.S. Cl. .................................. 528/18; 252/389 R; 252/390; 528/34; 528/901; 427/387; 427/388.1; 428/447
[58] Field of Search ............. 252/389 R, 390; 528/18, 528/34, 901

[56] References Cited

U.S. PATENT DOCUMENTS

| | | | |
|---|---|---|---|
| 4,483,972 | 11/1984 | Mitchell | 528/18 |
| 4,483,973 | 11/1984 | Lucas | 528/21 |
| 4,489,191 | 12/1984 | Chung | 528/21 |
| 4,489,199 | 12/1984 | Wengrovius | 528/16 |

*Primary Examiner*—Melvyn I. Marquis
*Attorney, Agent, or Firm*—William A. Teoli; James C. Davis, Jr.; James Magee, Jr.

[57] ABSTRACT

Room temperature vulcanizable organopolysiloxane compositions are provided which exhibit improved stability and a reduced tendency to corrode copper metal upon contact over an extended period of time. These moisture curable compositions utilize diorganotinaryltriazolate as a condensation catalyst.

7 Claims, No Drawings

ROOM TEMPERATURE VULCANIZABLE ORGANOPOLYSILOXANE COMPOSITIONS AND METHOD FOR MAKING

Reference is made to copending application of J. H. Wengrovius and T. P. Lockhart for Room Temperature Vulcanizable Organopolysiloxane compositions Ser. No. 583,530, filed Feb. 24, 1984 now U.S. Pat. No. 4,517,337 and copending applications Ser. No. 644,892 of J. H. Wengrovius and L. W. Niedrach and Ser. No. 644,891 of J. H. Wengrovius and T P. Lockhart for Room Temperature Vulcanizable Organopolysiloxane Compositions and Method for Making, filed concurrently herewith, assigned to the same assignee as the present invention and incorporated herein by reference.

BACKGROUND OF THE INVENTION

The present invention relates to room temperature vulcanizable organopolysiloxane compositions having improved shelf stability and a reduced tendency to corrode copper metal. More particularly, the present invention relates to moisture curable organopolysiloxane compositions using a tin condensation catalyst having organo radicals attached to tin by carbon tin linkages and whose remaining valences are satisfied by an arylotriazolate group, for example, di(n-butyl)tin bis(-benzotriazolate).

Prior to the present invention, as shown by Brown et al., U.S. Pat. No. 3,161,614, attempts were made to make stable room temperature vulcanizable (RTV) compositions employing a polyalkoxy end blocked polysiloxane and a monocarboxylic acid metal salt catalyst, such as dibutyltindilaurate. These compositions did not cure satisfactorily. Improved results were obtained by Beers, U.S. Pat. No. 4,100,129, assigned to the same assignee as the present invention, utilizing as a condensation catalyst, a silanol reactive organometallic ester having organo radicals attached to metal through metal-oxygen-carbon linkages. Experience has shown that in instances where silanol reactive organo tin compounds are used as RTV condensation catalysts which have organo radicals attached to tin by tin-oxygen-carbon linkages, the resulting moisture curable compositions are often unstable.

As utilized hereinafter, the term "stable" as applied to the one package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Further advances were achieved with the employment of silane scavengers for eliminating chemically combined hydroxy radicals, water, or methanol, as shown by White et al., U.S. Pat. No. 4,395,526, assigned to the same assignee as the present invention and incorporated herein by reference. However, the preparation of these silane scavengers, such as methyldimethoxy-(N-methylacetamide)silane often require special techniques and undesirable by-products can be generated during cure. Further improvements are shown by Dziark, U.S. Pat. No. 4,417,042 for scavengers for one component alkoxy functional RTV compositions and processes, assigned to the same assignee as the present invention and incorporated herein by reference.

Organic scavengers for trace amounts of water, methanol and silanol are shown by White et al., Serial No. 481,524, for One Package, Stable, Moisture Curable Alkoxyterminated Organopolysiloxane Compositions, filed Apr. 1, 1983, now Patent No. 4,472,551 assigned to the same assignee as the present invention and incorporated herein by reference. Additional scavenging techniques for chemically combined hydroxy functional radicals are shown by Lockhart in copending applications Ser. No. 481,529, now U.S. Pat. No. 4,499,230, Ser. No. 481,527, now U.S. Pat. No. 4,499,229, Ser. No. 481,528, now U.S. Pat. No. 4,477,625, and Ser. No. 481,530, now U.S. Pat. No. 4,467,063, filed concurrently on Apr. 1, 1983.

Although the above discussed techniques for improving the stability of room temperature vulcanizable organopolysiloxane compositions employing a tin condensation catalyst have been found to provide stable, substantially acid-free, curable organopolysiloxanes, a separate organic, inorganic, or organosilicon scavenger for hydroxy functional radicals is required.

The present invention is based on a discovery that stable room temperature vulcanizable compositions which also exhibit outstanding corrosion resistance to copper can be achieved by employing a tin condensation catalyst having the formula $$(R)_2Sn(Q)_2 \tag{1}$$

where Q is a monovalent radical selected from a triazole having the formula,

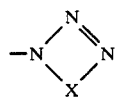

and an imidazole having the formula,

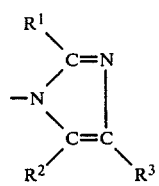

where R is selected from $C_{(1-18)}$ monovalent hydrocarbon radicals and substituted $C_{(1-18)}$ monovalent hydrocarbon radicals, $R^1$, $R^2$ and $R^3$ are selected from the same or different monovalent radicals selected from hydrogen and R radicals and X is divalent $C_{(1-50)}$ organic radical selected from hydrocarbon radicals and substituted hydrocarbon radicals.

Statement of the Invention

There is provided by the present invention a room temperature vulcanizable organopolysiloxane composition comprising by weight,
(A) 100 parts of alkoxy terminated organopolysiloxane, (B) 0 to 10 parts of polyalkoxy silane,
(C) 0 to 5 parts of amine accelerator,
(D) an effective amount of a tin condensation catalyst of formula (1), and
(E) 0 to 5 parts of a ligand forming material selected from a triazole having the formula,

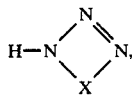

and an imidazole having the formula,

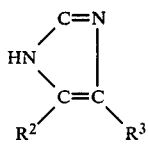

where X, $R^2$ and $R^3$ are as previously defined.

Also included within the scope of the present invention is a method for making room temperature vulcanizable organopolysiloxane compositions which comprises mixing together under substantially anhydrous conditions, the following ingredients by weight:
 (i) 100 parts of alkoxy terminated organopolysiloxane,
 (ii) 0 to parts of polyalkoxy silane,
 (iii) 0 to 5 parts of amine accelerator,
 (iv) an effective amount of a tin condensation catalyst of formula (1), and
 (v) 0 to 5 parts of ligand forming material as previously defined.

In a further aspect of the present invention, there is provided a method for making a room temperature vulcanizable organopolysiloxane compositions which comprises,
 (1) agitating under substantially anhydrous conditions,
  (a) 100 parts of a silanol terminated polydiorganosiloxane,
  (b) 0.1 to 10 parts of alkoxy silane,
  (c) 0 to 5 parts of amine accelerator,
  (d) 0 to 700 parts of filler, and
  (e) 0 to 5 parts of ligand forming material as previously defined,
 (2) allowing the mixture of (1) to equilibrate to produce polyalkoxy terminated polydiorganosiloxane, and
 (3) further agitating the mixture of (2) under substantially anhydrous conditions with an effective amount of a tin condensation catalyst of formula (1).

Some of the silanol terminated polydiorganosiloxanes which can be used to make the stable, substantially acid-free, moisture curable organopolysiloxane compositions of the present invention have the formula,

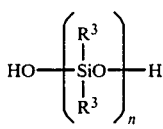

where $R^3$ is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, hydrogen and mixtures thereof, and n is an integer having a value of from about 5 to about 5000.

Polyalkoxy terminated organopolysiloxane which can be used to make the RTV compositions of the present invention has the formula,

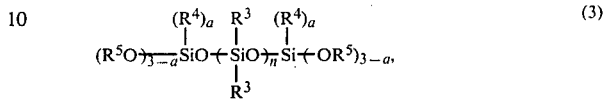

where $R^3$ and n are as previously defined, $R^4$ is a monovalent radical selected from $C_{(1-13)}$ hydrocarbon radicals and substituted $C_{(1-13)}$ hydrocarbon radicals, $R^5$ is a $C_{(1-8)}$ aliphatic organic radical selected from alkyl radicals, alkylether radicals, alkylester radicals, alkylketone radicals and alkylcyano or a $C_{(7-13)}$ aralkyl radical and a is a whole number equal to 0 or 1.

The RTV compositions of the present invention can contain a cross-linking polyalkoxysilane having the formula,

where $R^4$, $R^5$ and a are as previously defined.

Radicals included within R of formula (1) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives thereof, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl. Radicals included within $R^1$ and $R^2$ are, for example, hydrogen, methyl, ethyl, propyl and mixtures thereof; $R^3$ and $R^4$ are monovalent radicals selected from R radicals; radicals included within $R^5$ are, for example, $C_{(1-8)}$ alkyl radicals, for example, methyl, ethyl, propyl, butyl, pentyl; $C_{(7-13)}$ aralkyl radicals, for example, benzyl, phenylethyl, alkylether radicals such as 2-methoxyethyl, alkylester radicals, for example, 2-acetoxyethyl, alkylketone radicals, for example 1-butan-3-onyl, alkylcyano radicals, for example, 2-cyanoethyl.

Some of the tin condensation catalysts included within formula (1) are, for example,
 di-N-butyltinbis(benzotriazole)
 di-N-butyltinbis(tolyltriazole)
 di-N-octyltinbis(benzotriazole)
 di-N-hexyltinbis(2-methylimidazole)

Included within the cross-linking polyalkoxysilanes of formula (4) are, for example, methyltrimethoxysilane; methyltriethoxysilane; ethyltrimethoxysilane; tetraethoxysilane; vinyltrimethoxysilane; etc.

Among the amine curing accelerators which can be used in the practice of the present invention are silyl substituted guanidines having the formula,

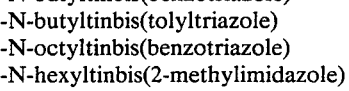

where $R^5$ is as previously defined, Z is a guanidine radical of the formula,

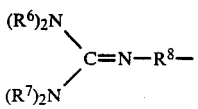

where $R^8$ is divalent $C_{(2-8)}$ alkylene radical, $R^6$ and $R^7$ are selected from hydrogen and $C_{(1-8)}$ alkyl radicals and g is an integer equal to 1 to 3 inclusive. In addition, alkyl substituted guanidines having the formula,

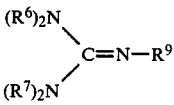

where $R^6$ and $R^7$ are as previously defined and $R^9$ is a $C_{(1-8)}$ alkyl radical, also can be employed. Some of the silyl substituted guanidines included within formula (5) are shown by Takago U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, λ-aminopropyltrimethoxysilane and methyldimethoxy-d-n-hexylaminosilane acts as both a cross-linker and curing accelerator. The primary amines, secondary amines, silylated secondary amines are preferred and secondary amines, and silylated secondary amines are particularly preferred. Silylated secondary amine such as alkyldialkoxy-n-dialkylaminosilanes and guanidines such as alkyldialkoxyalkylguanidylsilanes which are useful as cure accelerators.

In addition to the above-described amine accelerators, there is also included in the practice of the present invention the use of certain sterically hindered diamines which have been found to effect rapid cures of the RTV compositions of the present invention when utilized in effective amounts as previously defined. These nitrogen bases include, for example, di-t-butylethylene diamine (DBEDA), 1,5-diazabicyclo[4.3.0]non-5-ene (DBN), and 1,8-diazabicyclo[5.4.0]undec-7-ene (DBU).

Silanol-terminated polydiorganosiloxanes of formula (2) are well known and preferable have a viscosity in the range of from about 100 to about 400,000 centipoise and more preferable from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (2) also are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferable, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

In order to facilitate the cure of the RTV compositions of the present invention, the tin condensation catalyst of formula (1) can be utilized at from 0.1 to 10 part of tin catalyst per 100 parts of the silanol terminated or alkoxy terminated polydiorganosiloxane and preferably from 0.1 to 1.0 part per 100 parts of the polydiorganosiloxane.

Various fillers, pigments, adhesion promoters, etc., can be incorporated in the silanol or alkoxy-terminated organopolysiloxane, such as, for example, titanium dioxide, zirconium silicate, silica aerogel, iron oxide, diactomaceous earth, fumed silica, carbon black, precipitated silica, glass fibers, polyvinyl chloride, ground quartz, calcium carbonate, β-cyanoethyltrimethoxysilane, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts of more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example, stirring under moisture-free conditions, a mixture of materials which can consist of the tin condensation catalyst and the alkoxy terminated polydiorganosiloxane. Optionally, cross-linking polyalkoxysilane and amine accelerator can be used.

In instances where silanol terminated polydiorganosiloxane is used in place of the alkoxy terminated polydiorganosiloxane it is preferred that blending of the filler, for example, fume silica, the silanol terminated polydiorganosiloxane and the cross-linking polyalkoxysilane be performed and in the absence of the tin condensation catalyst. The tin condensation catalyst can be introduced advantageously after the resulting blend has been agitated for a period of about 24 hours at room temperature.

As used hereinafter, the expressions "moisture free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions a mixture of the silanol terminated polydiorganosiloxane or alkoxy terminated polydiorganosiloxane, filler and an effective amount of the tin condensation catalyst. There can be added to the mixture, the cross-linking silane or mixture thereof along with other ingredients, for example, the curing accelerator and pigments.

In order that those skilled in the art will be better able to practice the invention, the following example is given by way of illustration and not by way of limitation. All parts are by weight.

EXAMPLE 1

A mixture of 2 grams of dibutyltindimethoxide and 1.62 grams of benzotriazole in 20 ml. of methylenechloride was stirred for 15 minutes. Reaction volatiles were then removed in vacuo from the resulting solution and 3.05 grams of a white non-crystalline solid was obtained. Based on method of preparation and NMR spectra of the solid, there was obtained a 96% yield of dibutyltinbis(benzotriazole). The same procedure was repeated except that tolyltriazole was used in place of benzotriazole. The resulting dibutyltinbis(tolyltriazole) complex was recovered and characterized in an identical manner.

A base RTV methylpolysiloxane composition was prepared by thoroughly mixing under substantially anhydrous conditions, 100 parts of a methyldimethoxysiloxy terminated polydimethylsiloxane having a viscosity of 30,000 centipoises at 25° C., 0.3 parts of dibutyl amine, 30 parts of a trimethylsiloxy terminated polydimethylsiloxane having a viscosity of 100 centipoises at 25° C., 17 parts of fumed silica and 1.4 parts of β-cyanoethyltrimethoxysilane.

RTV formulations were prepared by mixing under substantially anhydrous conditions 100 parts of the above base polymer mixture, 0.3 part of dibutyltinbis(benzotriazole), 0.13 part of benzotriazole and 0.67 part of methyltrimethoxysilane. A second RTV mixture was prepared by mixing under substantially anhydrous conditions 100 parts of the base polymer mixture, 0.33 part of dibutyltinbis(tolyltriazole), 0.13 part tolyltriazole and 0.67 part of methyltrimethoxysilane. A third RTV formulation was prepared using the same base formulation and 0.35 part of dibutyltin(diethylmalonate) in place of the mixture dibutyltinbis(benzotriazole) and benzotriazole.

The above RTV formulations were mixed for 10 minutes in a Semco mixer. Upon exposure to atmospheric moisture, the formulations cured to a tack-free state in 20 minutes. No change in cure time was observed after heating the uncured formulations for 24 hours at 100° C. and then allowing them to cure upon exposure to atmospheric moisture. In addition, approximately 5 grams of the RTV compositions were applied to the surface of a 2"×2" section of clean copper metal. The respective RTV compositions were then allowed to cure for 7 days. The samples were then exposed to a 95% relative humidity environment at 20° F. for 28 days. A portion of the RTV was removed from the copper and the copper surface was then visually examined for corrosion. The copper surfaces in contact with the RTV's using the dibutyltinbistriazoles were found to be free of corrosion. However, the copper surface in contact with the RTV containing the dibutyltin(diethylmalonate) showed evidence of corrosion. Contact corrosion to copper also was found when commercial RTV's were evaluated. Evidence of corrosion is shown by the presence of a blue film on the copper and the presence of blue on the RTV surface in contact with the copper.

Although the above example is directed to a few of the very many variable which can be utilized in the practice of the methods of the presence invention and the RTV compositions made by such methods, it should be understood that the present invention is directed to the use of a much broader variety of tin condensation ctalysts as shown by formula (1) as well as the use of organopolysiloxane polymer, alkoxysilane and other ingredients in the RTV composition as shown in the description preceding this example.

What is claimed is:

1. A room temperature vulcanizable organopolysiloxane composition comprising by weight
   (A) 100 parts of alkoxy terminated organopolysiloxane;
   (B) up to 10 parts of polyalkoxy silane;
   (C) up to 5 parts of amine accelerator selected from the class consisting of primary amines, secondary amines, and silylated secondary amines and
   (D) an effective amount of a tin condensation catalyst of the formula

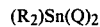

where Q is a monovalent radical selected from a triazole having the formula,

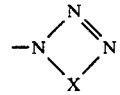

and an imidazole having the formula,

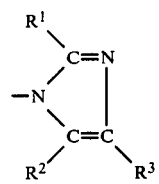

R is selected from $C_{(1-18)}$ monovalent hydrocarbon radicals and substituted $C_{(1-18)}$ monovalent hydrocarbon radicals, $R^1$, $R^2$ and $R^3$ are selected from the same or different monovalent radicals selected from hydrogen and R radicals and X is divalent $C_{(1-50)}$ organic radical selected from hydrocarbon radicals and substituted hydrocarbon radicals.

2. A composition in accordance with claim 1, where the tin condensation is dibutyltinbis(benzotriazolate).

3. A composition in accordance with claim 1, where the polyalkoxysilane is methyltrimethoxysilane.

4. A composition in accordance with claim 1, where the alkoxy terminated organopolysiloxane is methyldimethoxysiloxy terminated polydimethylsiloxane.

5. A composition in accordance with claim 1, where the tin condensation catalyst is dibutyltinbis(imidazole).

6. A method for making room temperature vulcanizable organopolysiloxane compositions which comprises mixing together under substantially anhydrous conditions, the following ingredients by weight:
(i) 100 parts of alkoxy terminated organopolysiloxane;
(ii) up to parts of polyalkoxy silane;
(iii) up to 5 parts of amine accelerator selected from the class consisting of primary amines, secondary amines, and silylated secondary amines and
(iv) an effective amount of a tin condensation catalyst of the formula

where Q is a monovalent radical selected from a triazole having the formula,

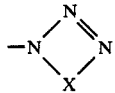

and an imidazole having the formula,

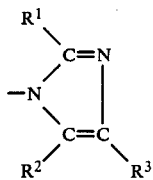

R is selected from $C_{(1-18)}$ monovalent hydrocarbon radicals and substituted $C_{(1-18)}$ monovalent hydrocarbon radicals, $R^1$, $R^2$ and $R^3$ are selected from the same or different monovalent radicals selected from hydrogen and R radicals and X is divalent $C_{(1-50)}$ organic radical selected from hydrocarbon radicals and substituted hydrocarbon radicals.

7. A method for making a room temperature vulcanizable organopolysiloxane compositions which comprises, (1) agitating under substantially anhydrous conditions
(a) 100 parts of a silanol terminated polydiorganosiloxane;
(b) 0.1 to 10 parts of alkoxy silane;
(c) up to 5 parts of amine accelerator selected from the class consisting of primary amines, secondary amines, and silylated secondary amines and
(d) up to 700 parts of filler
(2) allowing the alkoxysilane and the silanol terminated polydiorganosiloxane in the mixture of (1) to intercondense to produce polyalkoxy terminated polydiorganosiloxane and
(3) further agitating the mixture of (2) under substantially anhydrous conditions with an effective amount of a tin condensation catalyst of the formula $(R)_2Sn(Q)_2$ where Q is a monovalent radical selected from a triazole having the formula,

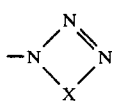

and an imidazole having the formula,

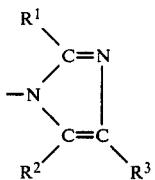

R is selected from $C_{(1-18)}$ monovalent hydrocarbon radicals and substituted $C_{(1-18)}$ monovalent hydrocarbon radicals, $R^1$, $R^2$ and $R^3$ are selected from the same or different monovalent radicals selected from hydrogen and R radicals and X is divalent $C_{(1-50)}$ organic radical selected from hydrocarbon radicals and substituted hydrocarbon radicals.

* * * * *